United States Patent Office 3,456,295
Patented July 22, 1969

3,456,295
METHOD AND APPARATUS FOR IMPROVING THE COATABILITY IN THE MANUFACTURE OF COATED WELDING ROD OR WIRE
Yasuo Torigai, 653, 3-chome, Miyamoto-cho, Funabashi-shi, Chiba-ken, and Keizo Ishizaki, 36 Kutsukake-cho, Suginami-ku, Tokyo, Japan
Application Mar. 29, 1966, Ser. No. 552,655, which is a continuation-in-part of application Ser. No. 337,644, Jan. 14, 1964. Divided and this application May 22, 1967, Ser. No. 656,969
Claims priority, application Japan, Jan. 16, 1963, 38/1,208
Int. Cl. B29f 3/02, 3/10
U.S. Cl. 18—13                    8 Claims

ABSTRACT OF THE DISCLOSURE

Apparatus is provided for the uniform extrusion coating of flux mixtures on welding rod or wire, such apparatus including a flow guide, and means for applying directly thereto sonic vibration at a frequency from about 5000 to about 400,000 c.p.s., so as to maintain the flux mixture fed to the extrusion nozzle uniform, thereby preventing internal separation of liquid material from solid flux material of the flux mixture.

---

This application is a division of application Ser. No. 552,655, filed Mar. 29, 1966, now abandoned, which in turn is a continuation in part of application Ser. No. 337,644 filed Jan. 14, 1964, now abandoned.

This invention relates to apparatus for improving coating of welding rods or wires and more particularly, to apparatus for imparting agitation to the particles of the mixture to be coated on the welding rod or wire to facilitate coating as well as give an attractive appearance to the product.

It has heretofore been conventional in the manufacture of the coated arc welding electrode or the coated wire for automatic welding to provide a rod or wire cut to a desired length and pass this rod or wire through a coating machine via guide members. This is accomplished by extruding a mass of flux mixture under pressure onto the rod or wire by means of a nozzle to coat the rod or wire to a predetermined outside diameter, such a conventional device has, however, encountered difficulty due to the fact that the flux mixture is not a viscous fluid. The quality of the product is often very poor. Since the coating difficulties are affected by complicated factors, it has been very difficult, though not impossible, to enhance the productivity of the operation. Attempts have been made to vary the composition of the flux mixture used. It has been also proposed as mechanical countermeasures to raise extrusion pressures which are applied to flux mixture, to align the direction of extrusion with the axis of the rod or wire, and to improve the configuration of the extrusion orifice so that the flux passing therethrough may have lower frictional resistance, etc. These conventional attempts, however, could not attain satisfactory results.

The flux used for the covered arc welding electrode is formed by thoroughly mixing silica sand, lime, ilmenite, iron oxide, titanium, ferromanganese or organic substances in finely divided form of the order of 100 mesh. These components are combined with a binder or an aqueous solution of sodium silicate or potassium silicate. The flux mixture, therefore, is similar to a mixture of water and sand, except when organic substances are used in large amounts. The flux mixture, therefore, when flowing out of the nozzle from its compressed condition due to the shearing force, tends to exhibit a dilatancy or expansion in volume due to the separation of the particles. In the extreme case of the above phenomenon, a water-rich portion of the mixture is initially squeezed from the nozzle. The remaining portion thereby containing a lower proportion of water shows high viscosity and eventually solidifies, resulting in the coating process becoming impossible. Even if the above extreme conditions do not appear, the viscosity of the flux will increase during coating; the welding electrode obtained will show eccentricity, or the flux coating when dry will be extremely brittle. This is a main factor of low productivity.

It has been found that the undesirable results heretofore obtained are due to a change in the relative positions of the said particles, when the particles change from a compact filling status to a loose filling status when flowing. It has been found that by the instant invention the "squeeze-out" or "eccentricity" phenomenon can be substantially eliminated by imparting agitation to the particles of the flux, in addition to the normal extrusion pressures in proximity to nozzle, to thereby decrease resistance to coating.

It is therefore an object of the invention to provide an improved coating apparatus for the manufacture of coated welding electrode rod or wire to overcome the difficulties which would be encountered by the prior art.

The invention also provides an apparatus for improving coating in the manufacture of covered welding rod or wire comprising a coating machine, having a nozzle member disposed in said machine, and a means fixed at or in proximity to the nozzle member and capable of imparting agitation to the finely divided particles of the flux mixture during the extrusion.

Agitation may be imparted to the finely divided particles by impact to or vibration of the flux mixture. In the preferred embodiment, a sonic and/or ultrasonic vibration is employed. A low frequency mechanical vibrator or commercially available electric vibrator will often give unsatisfactory results. In this case, the pulses of energy given to the particles of the flux will be relatively intermittent because of the high speed of coating process of the welding rod or wire. The sonic and/or ultrasonic vibration are preferred for the invention and should be within the range of approximately 5,000 to 400,000 c.p.s. Such vibration will be eventually converted to mechanical vibration at or near the nozzle member of the coating machine. In the preferred embodiment, a sonic and/or ultrasonic vibrator is used in combination with a horn. They can be mounted at or near the nozzle member with proper fastening means so that vibration can be imparted in a direction which is substantially parallel with, or substantially perpendicular to, the direction of flux flow. The sonic and/or ultrasonic vibration appears as mechanical vibration of the nozzle member or the member adjacent thereto and then as mechanical vibration of the flux particles themselves. The resistance to coating will thus be decreased, and in cooperation with the proper pressure caused by the piston, a smooth coating of the welding rod or wire can be obtained. It is, of course, possible to provide a plurality of such vibrators if desired. These, for example, can be mounted in opposed or adjacent positions to each other.

The invention will be further described with reference to the accompanying drawings in which.

Figure 1:
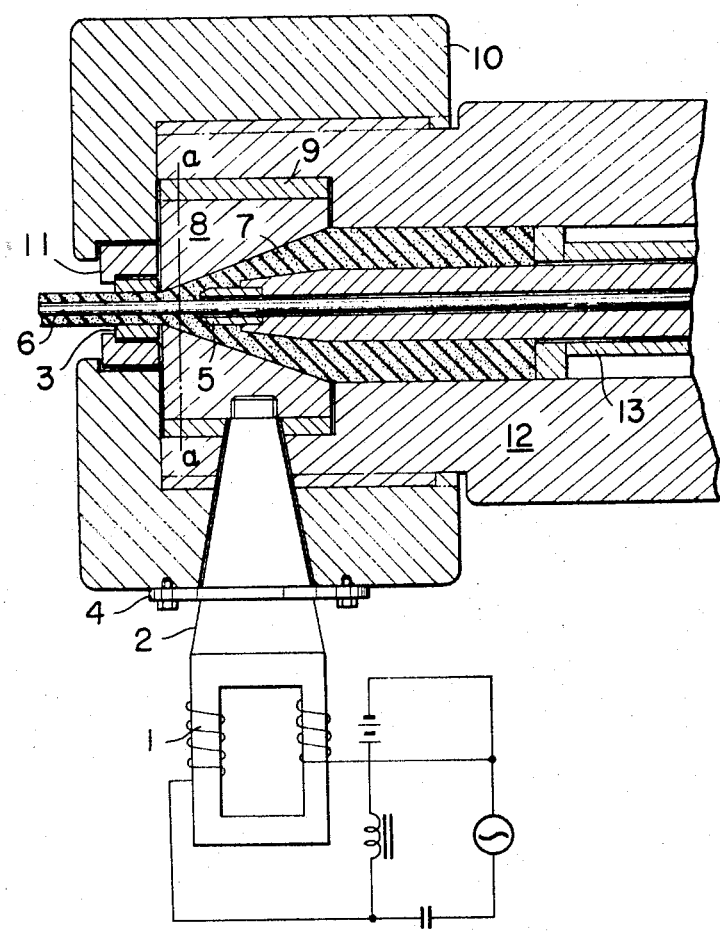
FIGURE 1 is a longitudinal section of a coating machine in accordance with the invention.

In FIGURE 1, a flux flow guide 8, and sleeve constructed of hard rubber 9 are fixed in the end of the cylinder 12 of a coating apparatus. At the end of flow guide 8, a nozzle 3 is held in position by die holder 11, which is threadably engaged on flux flow guide 8. A die holding cap 10 having a flanged portion is mounted on cylinder 12. The flanging portion of the die holding cap 10 extends over the edge of the holder 11, and retains the die holder 11 in a fixed relation to the cylinder 12.

The vibrating means comprises a vibrator element 1 and a horn 2 connected thereto. The horn 2 is threadably mounted on the flux flow guide 8 through apertures provided in the rubber sleeve 9, the cylinder 12 and the die holding cap 10. A flange 4 of the horn 2 secures the horn 2 to the cap 10 to prevent lateral movement.

Figure 2:
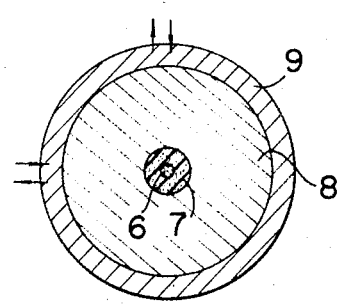
FIGURE 2 is a cross-sectional view taken along the line a—a of FIGURE 1.

To use the apparatus of the instant invention, a mass of flux mixture 7 is deposited into the cylinder 12 and subjected to pressure by movement of the piston 13 thereagainst. Simultaneously, sonic and/or ultrasonic waves are transmitted from the vibrator 1 through the horn 2, to the flux flow guide 8, in a direction perpendicular to the flow of the flux as shown in FIGURE 2 by the arrows. The vibration is thus transmitted to the flux mixture by vibration of the flux flow guide 8. The electrode rod is then passed through guide 5. As the electrode is passed through the nozzle 3, the flux mixture, which has been agitated by the vibrator means, will be coated on the rod or wire 6. Thus, the flux mixture is coated with decreased pressure and the coated product exhibits an improved smooth coating. By use of the instant apparatus, production can be increased from 60 to 95% above that of the conventional apparatus used in the prior art.

Figure 3:
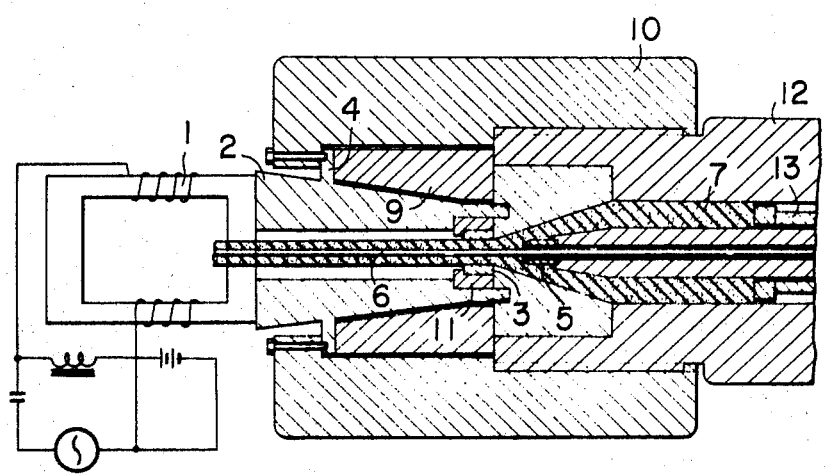
FIGURE 3 is a view in section of a second embodiment of a machine used to practice the invention.
Figure 4:
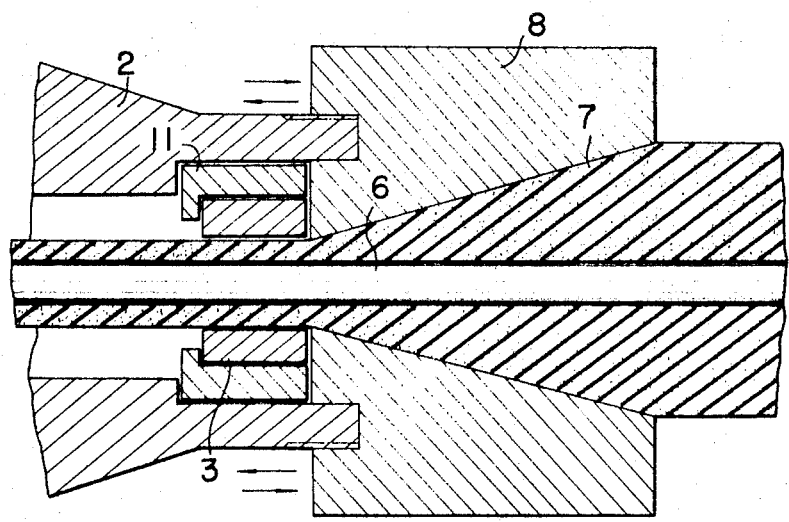
FIGURE 4 is an enlarged view of a portion of FIGURE 3.

FIGURES 3 and 4 show an alternative apparatus of the invention as described above. This apparatus is similar to the apparatus described in FIGURE 1 with the exception that the vibrator means 1 and the horn 2 are fixed to impart vibration parallel to the direction of flux flow. The horn 2, in the embodiment, contrasts the low guide 8 and the die holder 11. The die holding cap 10 extends over the flange 4 of the horn 2, and is secured thereto to prevent lateral movement of the horn.

In operation, the electrode or rod 6 is passed through guide 5 and pressure applied to the flux mixture 7 by exerting a force thereon by the piston 13. Simultaneously therewith, the vibrator 1 is caused to impart sonic and/or ultrasonic vibration to the flux mixture 7 by means of the horn 2, the die holder 11 and the flux guide 8. This sonic and/or ultrasonic vibration is transformed into mechanical vibration as it passes from the horn 2 to the die holder 11 and the flux guide 8. The vibration passes from the die holder 11 to the nozzle 3. Thus, the mechanical vibration of the nozzle 3 and the flux guide 8 imparts to the flux mixture the agitation desired.

Figure 5:
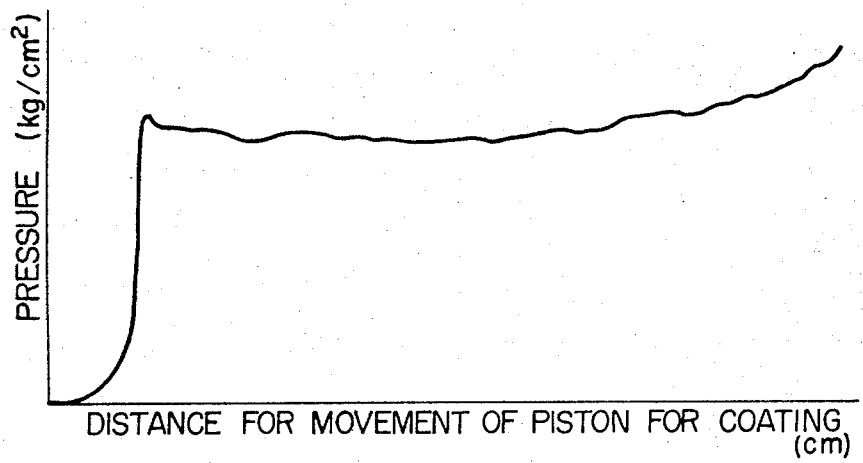
FIGURE 5 is a graph representing the pressure encountered in coating a welding electrode with flux without vibration.
Figure 6:
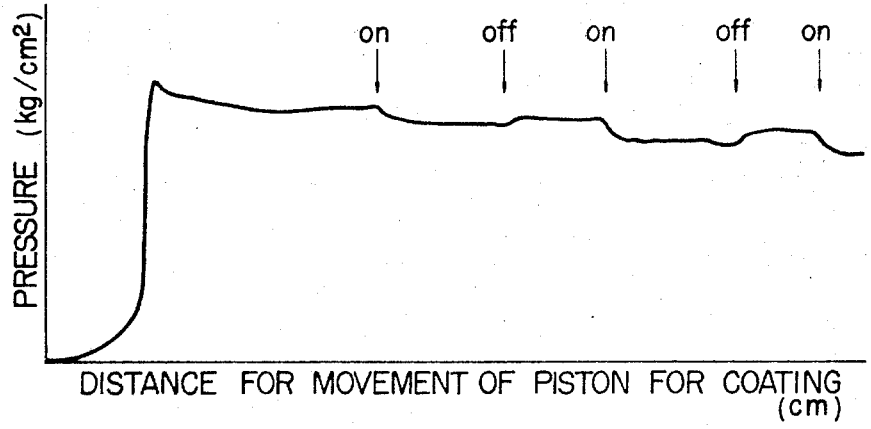
FIGURE 6 is a graph of the pressure under conditions similar to those of FIGURE 5, but exhibiting the effects of sonic and/or ultrasonic vibration upon the flux mixture when extruded using apparatus in accordance with the instant invention.

The reduction in extrusion pressure is shown by reference to graphs, FIGURES 5 and 6. FIGURE 5 shows the pressure required to coat an electrode rod or wire without the use of vibration. It should be noted that the pressure required to coat the rod or electrode constantly increases as the piston progresses. By reference to FIGURE 6, it can be seen that when sonic and/or ultrasonic vibratory means are employed in the coating operation, the pressure required to coat the wire or rod decreases upon the application of the vibration.

Having regard to the foregoing disclosure, the following is claimed as the inventive and patentable embodiments thereof:

1. An apparatus for the uniform extrusion coating of welding flux compositions composed of a mixture of liquid and solid flux materials, and having a tendency to separate internally into liquid material and solid flux material, with a resulting increase in extrusion pressure, during extrusion, comprising, in combination, an extrusion nozzle, a flow guide having an open central passage and disposed in close juxtaposition to the nozzle, but spaced therefrom, for guiding welding flux composition through the open passage thereof to the nozzle; means spaced from the flow guide for feeding welding rod or wire through the center of the nozzle and through the open passage of the flow guide, at a position spaced from the walls of said passage; means disposed in close juxtaposition to the flow guide but spaced therefrom for pressure-feeding said welding flux composition into and through the space between the welding rod or wire and the walls of the flow guide passage, thereby to surround and enclose the rod or wire fed therethrough in a sheath of welding flux composition; and means connected to the flow guide for applying directly to the flow guide sonic vibration at a frequency within the range from about 5000 to about 400,000 c.p.s., the spaced position of the flow guide relative to the nozzle, welding rod or wire feeding means and welding flux composition feeding means shielding them from such vibration; the vibrating flow guide means communicating such vibration to the welding flux composition passing therethrough, so as to maintain the welding flux composition uniform, and inhibit internal separation thereof into liquid material and solid flux components during extrusion, while maintaining a uniform extrusion of such composition at a uniform extrusion pressure.

2. An apparatus according to claim 1 wherein the vibration is applied approximately perpendicularly to the direction of extrusion.

3. An apparatus according to claim 2 wherein the vibration is applied to the flow guide in the same direction as the direction of extrusion.

4. An apparatus according to claim 1 wherein the sonic vibration is applied to the flow guide by direct contact therewith of the sonic vibration applying means.

5. An apparatus according to claim 1 wherein the means for applying sonic vibration to the flow guide comprises a sonic vibrator and a horn.

6. An apparatus according to claim 1 wherein the flow guide is mounted in a hard rubber sleeve supporting the guide, with the means for applying sonic vibration directly communicating such vibration to the flow guide through an opening in the sleeve.

7. An apparatus according to claim 1 wherein the means for feeding welding flux composition into the flow guide passage comprises a piston having means for forcing the welding rod or wire through an extrusion die.

8. An apparatus in accordance with claim 1 in which the sonic vibrator is an ultrasonic vibrator.

References Cited

UNITED STATES PATENTS

| | | |
|---|---|---|
| 2,198,085 | 4/1940 | LeTourneau et al. |
| 2,408,627 | 10/1946 | Green. |
| 2,802,237 | 8/1957 | Davis. |
| 3,002,614 | 10/1961 | Jones. |
| 3,233,012 | 2/1966 | Bodine. |
| 3,298,065 | 1/1967 | Pendleton. |

FOREIGN PATENTS

| | | |
|---|---|---|
| 135,344 | 11/1949 | Australia. |
| 143,071 | 1961 | Russia. |

WILLIAM J. STEPHENSON, Primary Examiner

U.S. Cl. X.R.

18—12